J. BURGE.

TIME-LOCK.

No. 7,073. Reissued April 25, 1876.

WITNESSES

Wm A Stinkle.

John P. Jacobs

INVENTOR

John Burge

Marcus S. Hopkins.

THE NORRIS PETERS CO., PHOTO-LITHO., WASHINGTON, D. C.

UNITED STATES PATENT OFFICE.

JOHN BURGE, OF CIRCLEVILLE, OHIO, ASSIGNOR, BY MESNE ASSIGNMENTS, TO THE YALE LOCK-MANUFACTURING COMPANY, OF STAMFORD, CONN.

IMPROVEMENT IN TIME-LOCKS.

Specification forming part of Letters Patent No. 123,378, dated February 6, 1872; reissue No. 7,073, dated April 25, 1876; application filed February 11, 1876.

*To all whom it may concern:*

Be it known that I, JOHN BURGE, of Circleville, in the county of Pickaway and State of Ohio, have invented a new and useful Improvement in Chronometric Locks; and that the following is a full, clear, and exact description of the same, reference being had to the accompanying drawings, and to the letters of reference marked thereon, making a part of this specification.

This invention relates to locks which are placed upon the inside doors of vaults or safes, and are moved and operated by clock-work, so that no key-hole or other aperture through the door is necessary; and as here embodied it consists in a mechanism composed of a revolving cam-wheel and actuating plate and springs, by means of which a continuous motion of the revolving parts in one direction locks and unlocks the door, the construction and arrangement being as hereinafter more fully described.

In other words, the invention consists of a chronometric lock, the revolving mechanism of which, by a continuous motion, locks and unlocks automatically, the locking being effected at a time subsequent to the closing of the door on which such lock is fixed, and not of necessity immediately upon closing the safe-door; and the unlocking also occurring at any desired time to which the chronometric lock may be adjusted, so that the locked and unlocked periods of the lock, during each day, or other recurrent interval, will follow each other with continuous regularity so long as the motion of the clock is maintained by duly winding it.

A lock made in accordance with my invention is capable of locking, by the action of the clock-work, at a time subsequent to the closing of the door.

In order that the invention may be fully understood, I have represented in the accompanying drawing, and will proceed to describe, a lock embodying my invention in the form devised by me at the date of my application for my original patent; but I do not limit or confine myself to the precise form or arrangement of any of the parts described, as they may be varied in many ways without departing from my invention.

Figure 1:
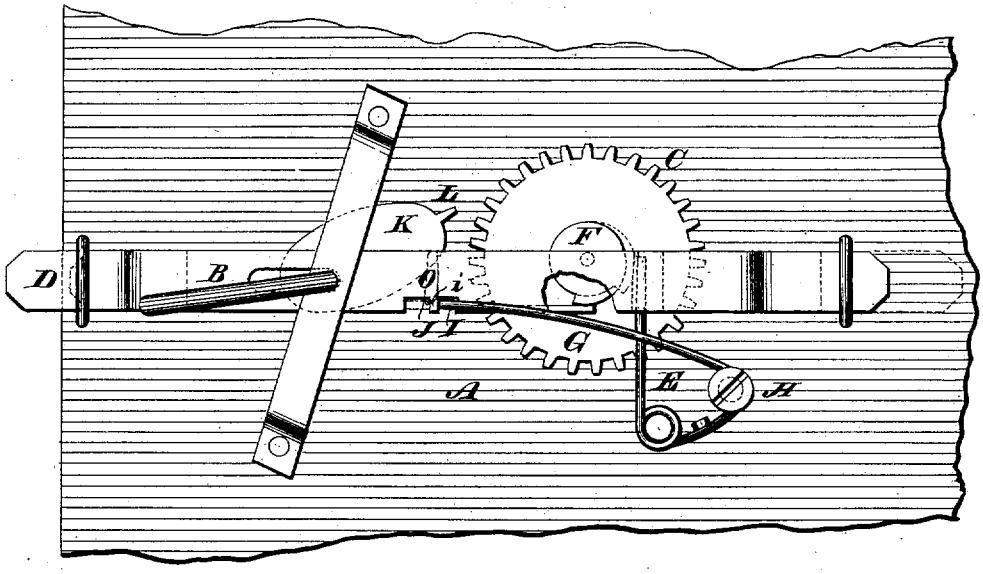
Figure 2:
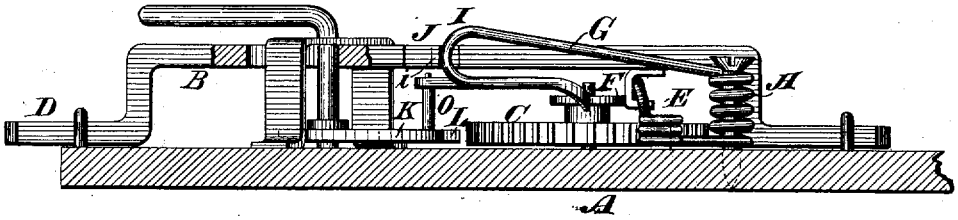

In the accompanying sheet of drawings, Figure 1 is an elevation of my chronometric lock, and Fig. 2 is an edge view of the same.

Similar letters of reference indicate like parts in the several figures.

A is the bed or plate of the lock. B is the bolt. C is a cog-wheel, which is revolved beneath the bolt. The latter moves upon its ends, the middle portion being raised so as to pass over the operating parts of the lock, as seen in Fig. 2. D is the locking-end of the bolt. E is a spring confined to the plate A, the end of which bears against a lug on the under side of the bolt with a constant pressure, and tends to shoot the bolt at all times. F is a cam attached to the wheel C, which throws the bolt back and unlocks the lock once for every revolution of the wheel. G is a spring pawl or dog, attached to the stud H, the end of which forms a hook, as seen in Fig. 2, which enters one of the two notches, I J, in the edge of the bolt, engaging, alternately, with the shoulders formed by the opposite sides of the projecting stump *i*, located between the said notches. This spring or dog tends to bear against the edge of the bolt with a constant pressure.

When the dog enters the notch I it holds the bolt locked, as seen in Fig. 1, by engaging with the shoulder formed by the rear side of the projecting stump *i*. When in the notch J it holds the bolt unlocked by engaging with the shoulder formed by the opposite or front side of the projecting stump *i*, thus performing the function of a dog or pawl to the bolt B. This spring or dog is thrown out from the bolt by the plate K, to which a revolving movement is given by clock-work connected therewith, actuated by spring or weight to revolve it.

I do not confine myself to any particular clock-work or mechanism for this purpose, but design to use any motive power within the safe or vault by which the purpose may be effected.

The plate K has upon its periphery one cog or finger, L, and on its side, and flush with its edge, a lug, O. At each revolution of the plate it engages with a cog in the wheel C, and moves the wheel a certain distance, one-eighth of a revolution, more or less, said plate and wheel being practically a continuation of the train of gearing of the clock-work connected therewith. As the finger leaves the wheel the lug O pushes the dog G from engagement with the shoulder of the projecting stump *i*, but the bolt will not be moved, except when forced back by the cam F, or forced forward into the locked position by the spring E. When the disengaging action of the lug O upon the dog G occurs simultaneously with the action of the cam F upon the bolt, the bolt will be retracted, and this, as before stated, will occur once for every revolution of the wheel C. Now, the clock-work may be so constructed and adjusted that the door will be unlocked once in twenty-four hours, or once in six or twelve hours, or once a week, as may be desired.

As shown in the drawing, the lock may also be prepared or set for the act of locking by pressing the spring-dog G downward, out of engagement with the shoulder of the stump *i*, and retracting the bolt by hand, so that the spring-dog G will engage with the opposite or forward shoulder of the stump *i*, and thus retain the bolt in its unlocked position. The plate K, being operated continuously, its revolution will then, in due time, disengage the spring-dog G from the shoulder of stump *i*, and permit the spring E to lock the bolt, the locking thus being performed by the automatic action of the clock-work at an interval of time subsequent to the closing of the door on which the lock is in use. Further, it will be seen by an examination of the drawing that the bolt will remain in the unlocked position so long as the cam F continues to hold it back by pressing against it, the circumferential dimension of this cam assisting to determine the period of time during which the bolt will remain in the unlocked position.

Having thus described my invention, what I claim as my improvements in chronometric locking mechanism are—

1. The combination, substantially as before set forth, of the bolting device adapted to secure the door by engaging with its jamb, the clock-work, and suitable intermediate connecting mechanism, whereby the clock-work determines the time at which the bolting device is locked or dogged by the operation of said clock-work.

2. The combination, substantially as before set forth, of the bolting device adapted to secure the door by engaging with its jamb, the clock-work, the dog, and suitable connecting mechanism, whereby the clock-work determines the time at which the dog is so engaged with the bolting device as to prevent the unlocking or retraction of the latter.

3. The combination, substantially as before set forth, of the bolting device, the clock-work, a revolving device operated continuously by said clock-work, and suitable connecting mechanism, whereby the said bolting device is periodically dogged by the continuous movement of said revolving device.

4. The combination, substantially as before set forth, of the bolting device, the clock-work, and two revolving devices operated by said clock-work, whereby the continuous movement of said clock-work acting upon said revolving devices determines the times at which said bolting device is both locked and unlocked.

5. The locking mechanism, adapted to secure the door independently of any combination or key lock, consisting of the combination, substantially as hereinbefore set forth, of, first, the bolting device adapted to secure the door by engaging with its jamb; second, the dog adapted to be set by hand prior to the closing of the door to permit said bolting device to remain in the unlocked position until the door is closed; third, the shoulder with which said dog engages to secure the bolting device in the locked position after the door is closed; fourth, the cam having an offset adapted to be automatically brought in and out of coincidence with the bolting device; and, fifth, the clock-work and connecting mechanism adapted to release the bolting device.

JOHN BURGE.

Witnesses:
THOMAS C. CONNOLLY,
HENRY R. TOWNE.